(12) United States Patent
Klemm et al.

(10) Patent No.: US 9,674,363 B1
(45) Date of Patent: Jun. 6, 2017

(54) ESTABLISHING A SOCIAL CONNECTION WITH A BUSINESS DURING A CONVERSATION

(71) Applicant: Avaya Inc., Santa Clara, CA (US)

(72) Inventors: Reinhard Klemm, Basking Ridge, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/951,196

(22) Filed: Nov. 24, 2015

(51) Int. Cl.
| | | |
|---|---|---|
| *H04M 3/00* | (2006.01) | |
| *H04M 5/00* | (2006.01) | |
| *H04M 3/51* | (2006.01) | |
| *G06Q 50/00* | (2012.01) | |
| *H04M 3/523* | (2006.01) | |

(52) U.S. Cl.
CPC .......... *H04M 3/5191* (2013.01); *G06Q 50/01* (2013.01); *H04M 3/5235* (2013.01)

(58) Field of Classification Search
CPC ... H04M 3/5191; H04M 3/5235; G06Q 50/01
USPC .......................... 379/265.09, 93.01; 709/226
See application file for complete search history.

(56) References Cited

U.S. PATENT DOCUMENTS

| | | |
|---|---|---|
| 8,634,543 B2 | 1/2014 | Flockhart et al. |
| 8,879,697 B2 | 11/2014 | Klemm et al. |
| 2010/0235218 A1 | 9/2010 | Erhart et al. |
| 2010/0296417 A1 | 11/2010 | Steiner |
| 2011/0125697 A1 | 5/2011 | Erhart et al. |
| 2011/0125793 A1 | 5/2011 | Erhart et al. |
| 2011/0125826 A1 | 5/2011 | Erhart et al. |
| 2012/0233546 A1* | 9/2012 | Gupta ................... G06Q 50/01 715/705 |
| 2014/0059126 A1 | 2/2014 | Klemm et al. |
| 2014/0270108 A1 | 9/2014 | Riahi et al. |
| 2014/0359008 A1 | 12/2014 | Finney et al. |
| 2015/0055772 A1 | 2/2015 | Klemm et al. |

* cited by examiner

*Primary Examiner* — Quynh Nguyen
(74) *Attorney, Agent, or Firm* — Sheridan Ross P.C.

(57) ABSTRACT

Associating callers of a contact center with their social media identity may provide mutual benefits to the caller and contact center. For example, a business operating a contact center can receive information about their current and potential customers and customers can receive additional information, incentives, or other perks by allowing access to their social media profile. When a caller initially calls a contact center, they are prompted, and possibly incentivized, to provide a social media identity. The social media identity may or may not have an affinity with an organization on the social media website. If not, the caller is provided with the opportunity to establish the affinity. If the caller does establish the affinity, the call may be identified as having a positive sentiment or negative sentiment if the caller does not do so. The call, or future calls, with the caller may then be processed accordingly.

20 Claims, 7 Drawing Sheets

ESTABLISHING A SOCIAL CONNECTION WITH A BUSINESS DURING A CONVERSATION

FIELD OF THE DISCLOSURE

The present disclosure is generally directed toward associating a node on a first electronic network to a node on a second electronic network.

BACKGROUND

Contact centers and the companies they support have an interest in acquiring as much context as possible about the individuals calling the contact center. The caller context can aid in call routing, issue resolution, on-call marketing, and beyond. One valuable source of caller context is social media because a caller's social media activity and profiles provide insights into the caller's persona (e.g., name, age, gender, education, interests, hobbies, etc.) as well as the caller's potential value to the business. For example, a caller who posts about their experiences with flights on various airlines on social media reveals a lot about their travel frequency, destinations, and preferences, thus providing valuable insights to an airline. The value of this information is particularly high if this caller is not yet known to the called business.

SUMMARY

It is with respect to the above issues and other problems that the embodiments presented herein were contemplated. In one embodiment, systems and methods are disclosed to establish a social media connection between a caller and a business during a conversation therebetween.

Customers are used to providing personal information to companies for free in return for better service, discounts, useful marketing, etc. Many customers, therefore, are not opposed to sharing their social media profiles and activities with a business whose contact center they are calling. Social media can also act as a valuable add-on channel to a primary conversation channel between a customer and a contact center agent or the business at large. The value of the add-on channel can extend to both the customer and the business. However, the prior art does not support the sharing of a caller's social media information with the contact center.

Embodiments disclosed solve these and other issues by providing a system and method operable to establish a social connection between a caller and a business during a conversation by injecting an IVR prompt to connect to a business's social media site.

A customer calls a business's contact center. During the hold time for an agent, the contact center's interactive voice response (IVR) prompts the caller for an optional login to a social network, such as Facebook, and explains the benefits of the login for the customer, such as expedited authentication and/or other benefits.

In one embodiment, a system receives the customer's social network login and determines whether the customer has an existing social relationship with the business on the social network. When a customer calls the business's contact center and it is determined that a social relationship does not exist, the proposed system can inject a voice prompt into the IVR before or after the conversation with the agent. The voice prompt asks the customer if they want to "friend," "like," "follow," or use any other convention for the business's social media site to enable the caller to establish a connection, relationship, express interest, etc. The site pushed by the business may be selected dynamically at runtime by the business based on a desire to increase usage of the site, the potential topic, and/or the specific Customer Relationship Management (CRM) information for a specific caller. If the customer is pleased with the service received from the business, in general, during this call or is generally favorably inclined towards the business, they may be willing to establish this social relationship with the business.

A simple dual-tone multi-frequency (DTMF) input action and/or voice response by the customer suffices to give consent to entering into the social relationship. The system will thus establish the social connection through the social network AP using the customer's authenticated session with the social network. Optionally, the system can ask the customer for extended permissions related to the social media connection.

The social network login can be accomplished through various means depending on how the call to the contact center is established. The login process can be part of the IVR tree or the simplified one-click login mechanism, which is supported by social networks. If the call is established via a click-to-call mechanism or an application that sets up the call, the one-click login mechanism can be made part of the call establishment process.

The establishment of a social network connection between the customer and the business is advantageous for the business as such an establishment will enlarge the business's measurable social media audience (e.g., likes/followers count). Furthermore, the business can deduce a certain level of customer satisfaction from the customer's "friend" action and conversely a certain level of customer dissatisfaction if the customer opts to not "friend" the business. By analyzing the demographics of customers who friend the business versus those who choose not to, the business can gain valuable insights into correlations between customer demographics and customer satisfaction without having to explicitly poll customers. The social network itself can be a source of demographic information.

Likewise, other types of insights can be gained without explicit polling. For example, by prompting some customers to friend a business before the customer/agent interaction and prompting a control group to friend the business after the customer/agent interaction, the business can assess the customer perception of the quality of the customer/agent interaction.

In one embodiment, a system is disclosed, comprising: a communication interface to a network; a processor to: access a call from a caller from the network; prompt the caller to provide a social media identity of the caller on a social media website; upon receiving the social media identity of the caller, determine if an affinity exists between the social media identity and an entity associated with the contact center; and upon determining that the affinity exists, determine an interaction with the caller in accordance with the affinity In another embodiment, a method is disclosed, comprising: accessing a call from a caller on a network; prompting the caller to provide a social media identity of the caller on a social media website; upon receiving the social media identity of the caller, determining if an affinity exists between the social media identity and an entity associated with the contact center; and upon determining that the affinity exists, determine an interaction with the caller in accordance with the affinity.

In another embodiment, a system is disclosed, comprising: a communication interface to a network; a processor to:

access a call from a caller from the network; prompt the caller to authenticate a social media identity of the caller on a social media website; upon receiving the authentication of the social media identity of the caller, determine if an affinity exists between the social media identity and an entity associated with the contact center; and upon determining that the affinity exists, determine an interaction with the caller in accordance with the affinity.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
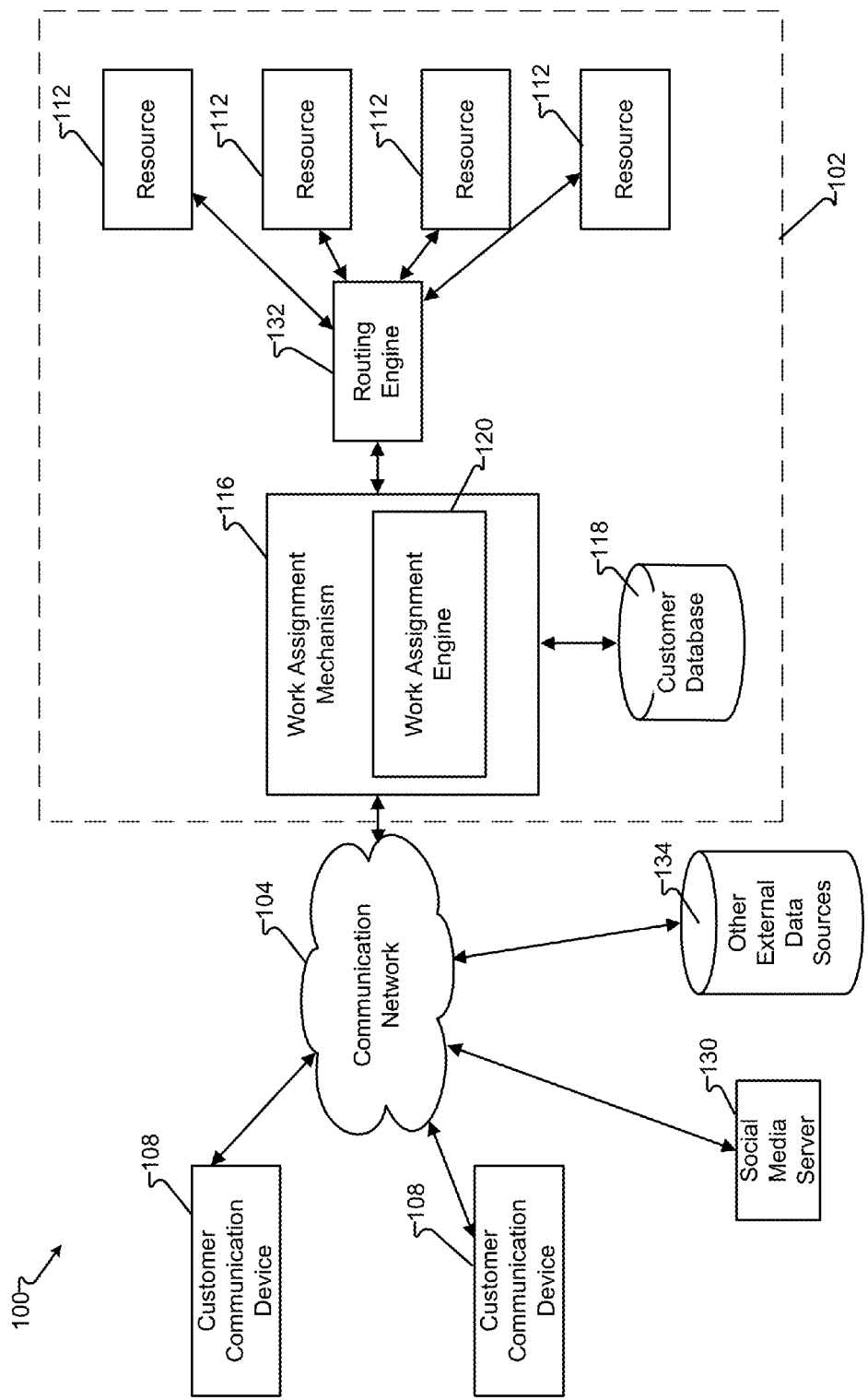
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources located on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
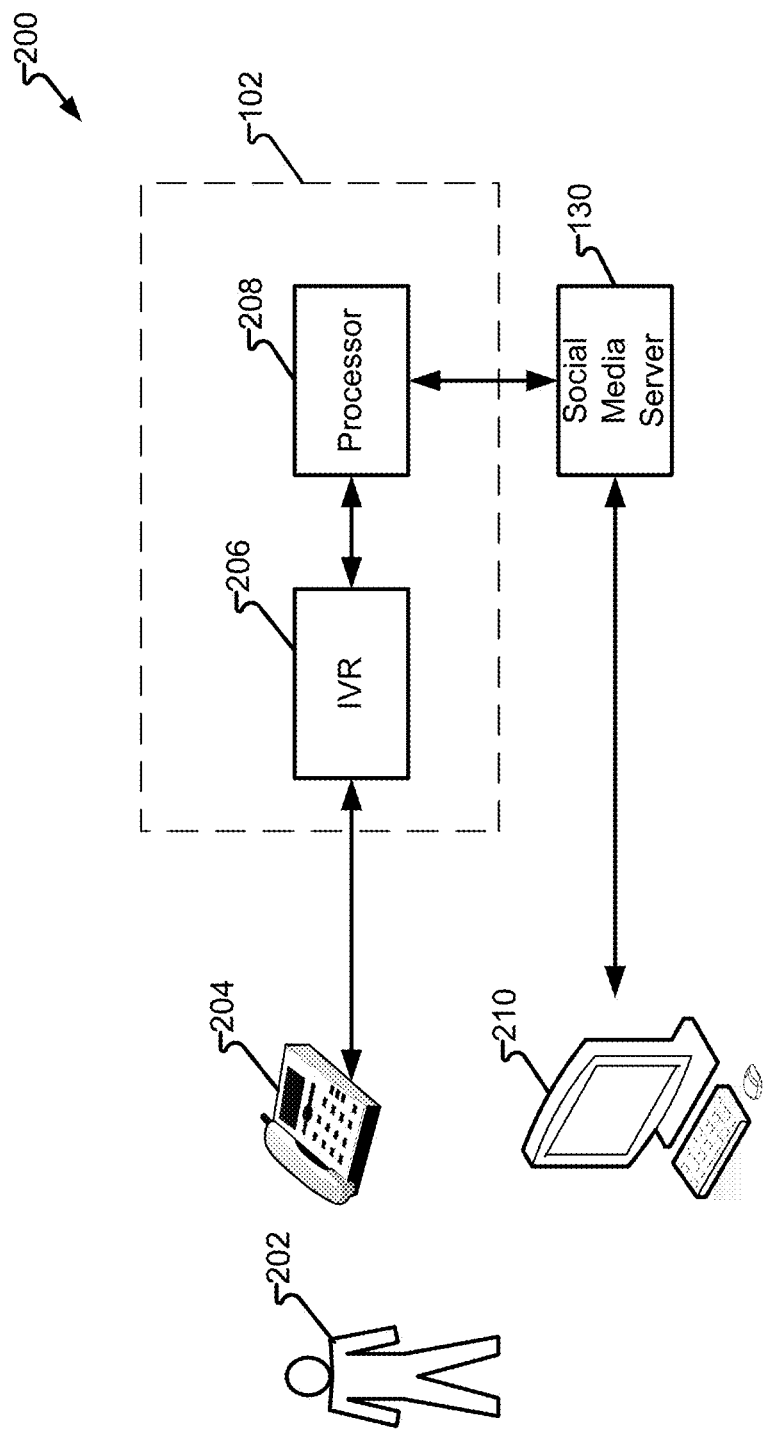
FIG. 2 depicts a second system in accordance with embodiments of the present disclosure.

FIG. 2 depicts system 200 in accordance with embodiments of the present disclosure. In one embodiment, system 200 comprises contact center 102. To avoid unnecessarily complicating the figure, FIG. 2 illustrates a portion of the components of contact center 102 provided with respect to FIG. 1. In particular, interactive voice response (IVR) 206 and a processor 208. IVR 206 and processor 208 may comprise automated resource 112 and/or a portion comprising or comprised by work assignment mechanism 116, work assignment engine 120, and/or routing engine 132.

In another embodiment, customer 202 places a call using telephone 204. A resource 112 accepts the call, such as when resource 112 is embodied by IVR 206. Contact center 102 may have certain information associated with customer 202, such as information provided by customer 202 directly to IVR 206, caller identification (e.g., CallerID), etc. accessing customer database 118 and/or other data sources. However, caller 202 may have a social media identity that is initially unknown to contact center 102.

In other embodiments, telephone 204 comprises, is comprised by, or integrated with other forms of customer communication device 108. For example, telephone 204 may be an endpoint for SMS texts, text chat, email, video chat, or other forms of communication. Accordingly, telephone 204 and computing device 210 may be the same customer communication device 108. However, merely as an aid to clarity, the embodiment herein illustrates the use of telephone 204 to provide a voice-only call and computing device 210 is utilized for accessing social media server 130.

Caller 202 is prompted by IVR 206, which may be further directed by processor 208, to provide a social media identifier (e.g., user name, sign-on, user name/password, etc.). Processor 208, upon receiving the social media identifier as a response to IVR 206, accesses a data repository (not shown) and/or social media server 130, such as via a webpage or other interface associated with social media server 130. Processor 208 determines if an affinity between the social media identity and contact center 102 or, optionally, an organization who authorizes contact center 102 to operate on its behalf. If an affinity (e.g., "like" on Facebook, "link" on LinkedIn, "follow" on Twitter/Instagram, etc.) exists, processor 208 may then access the profile of the social media identity and associate the social media identity with caller 202. Processor 208 may then analyze content of social media server 130 associated with caller 202, via the social media identity, to determine relevant aspects of caller 202 and/or identify a candidate reason for caller 202 to the place the call.

If no affinity exists, IVR 206 may prompt caller 202 to provide or accept an affinity. For example, caller 202 may be instructed to "friend" contact center 102 (or an organization authorizing contact center 102) or to "accept" a friend request from the organization. Processor 208 may then initiate an affinity request to the social media identifier associated with caller 202 and/or accept an affinity request therefrom. The affinity may be between the social media identity of caller 202 with contact center 102, an organization represented and/or authorized to operate on behalf of contact center 102, and/or a segment thereof. For example, caller 202 may be prompted to establish an affinity via a "like" of a particular car made by an automobile manufacturer, a charitable or other campaign associated with an enterprise (e.g., a charity tennis tournament sponsored by a brokerage company), or other enterprise or social media aspect associated with an enterprise.

Figure 3:
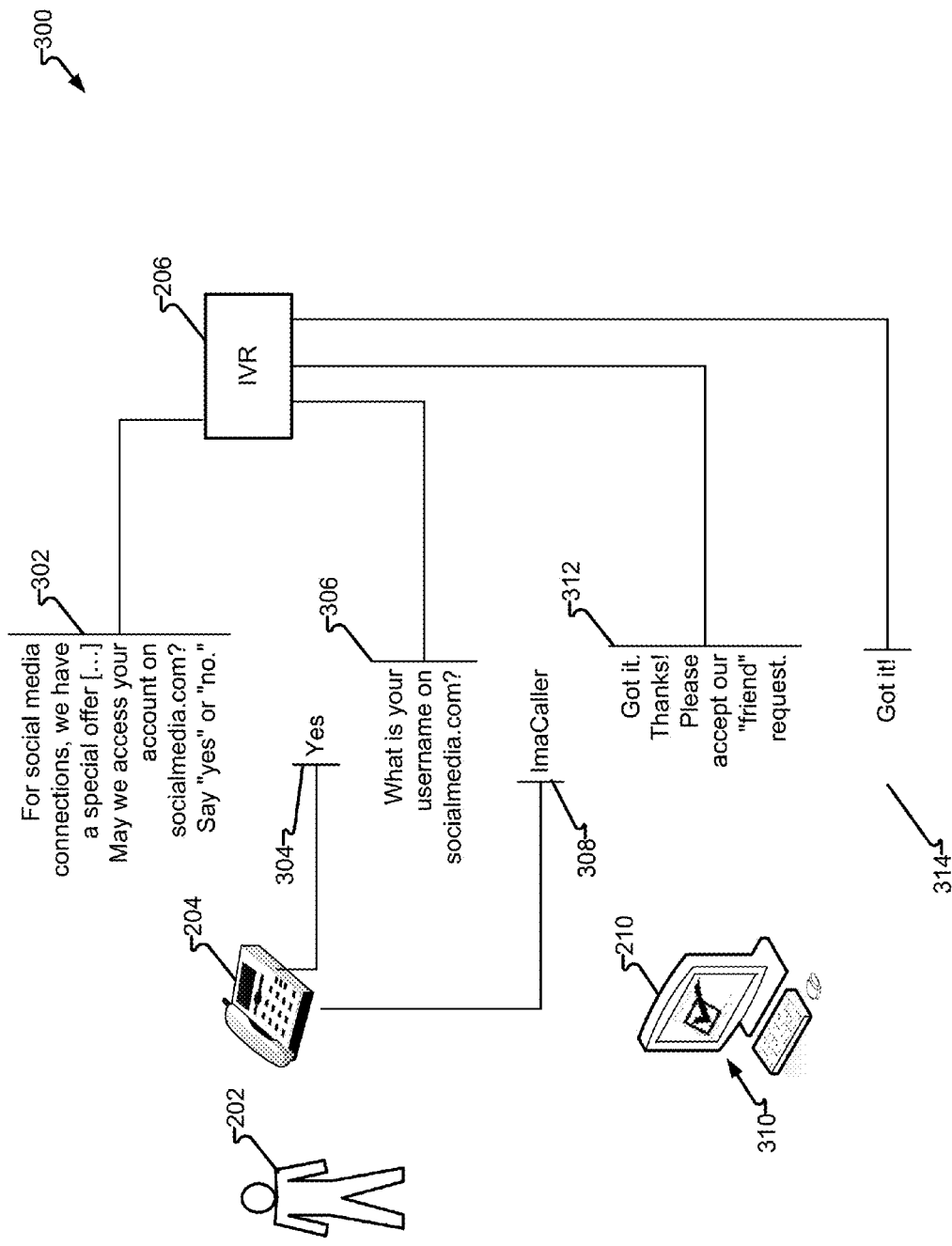
FIG. 3 depicts a first exchange in accordance with embodiments of the present disclosure.

FIG. 3 depicts exchange 300 in accordance with embodiments of the present disclosure. In one embodiment, IVR 206 provides audio prompt 302 asking for permission to have the social media identity of caller 202 on a specific social media website ("socialmedia.com"). In one embodiment, caller 202, utilizing telephone 204, provides response 304 indicating a grant of permission. Caller 202 may alternatively respond in the negative or not at all, which may be treated as a refusal to grant permission or a lack of presence on the specific social media website and/or any social media website.

Upon receiving permission, IVR 206 presents prompt 306 asking for the social media identity. In one embodiment, caller 202 provides response 308 (e.g., username "Ima-Caller") as a verbal response, as will be described more completely with respect to FIG. 4. Other response types may also be provided. IVR 206, such as via processor 208 and social media server 130, may then provide prompt 312 to accept an affinity and/or prompt user 202 to accept an affinity request initiated by processor 208. Caller 202 may then utilize computing device 210 to accept 310 the affinity request or to initiate the affinity request. IVR 206 may provide acknowledgment 314 to indicate that the affinity has been received and/or established.

Figure 4:
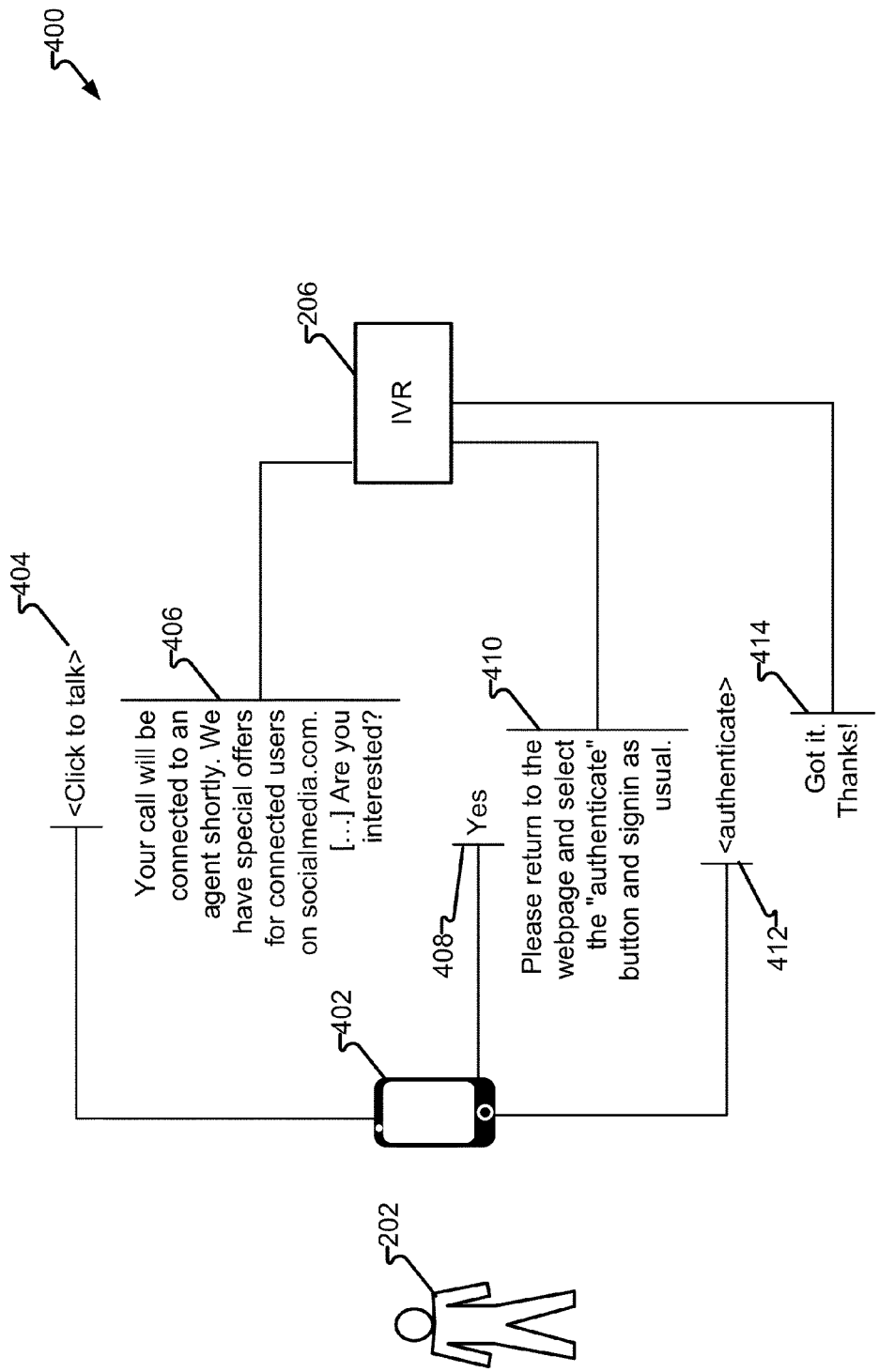
FIG. 4 depicts a second exchange in accordance with embodiments of the present disclosure.

FIG. 4 depicts exchange 400 in accordance with embodiments of the present disclosure. In one embodiment, caller 202 utilizes device 402. In one embodiment, device 402 is both an Internet connected device and telephony device (e.g., smartphone, softphone, etc.). In another embodiment, device 402 may be a computer (e.g., computing device 210) or a distinct telephone device.

In one embodiment, device 402 initiates a call, such as by selecting an operation on a webpage or application, such as "click to talk" button 404. IVR 206 responds with prompt 406 asking for permission to have an affinity with caller 202 and, optionally, provide incentives for caller 202 to agree to the affinity. If caller 202 provides indication 408 of agreement, IVR 206 may provide instructions 410 on how to initiate and/or accept the affinity. In one embodiment, IVR 206 instructs caller 202 to "authenticate" themselves on the social media website (e.g., "socialmedia.com"). For example, a webpage or application, which may include the "click to talk" feature, may display logos for a selected one social media website 130 or a plurality of social media websites. The logos may have a link to their respective social media website 130 and means to authenticate the user, such as caller 202, and a device, such as device 402. Caller 202 then authenticates 412 and IVR 206 may then respond with confirmation 414. It should be appreciated that IVR 206 may be an automated resource 112 when embodied as an automated text-based agent or other automated agent operable to conduct an interaction with customer 202 via device 402.

Figure 5:
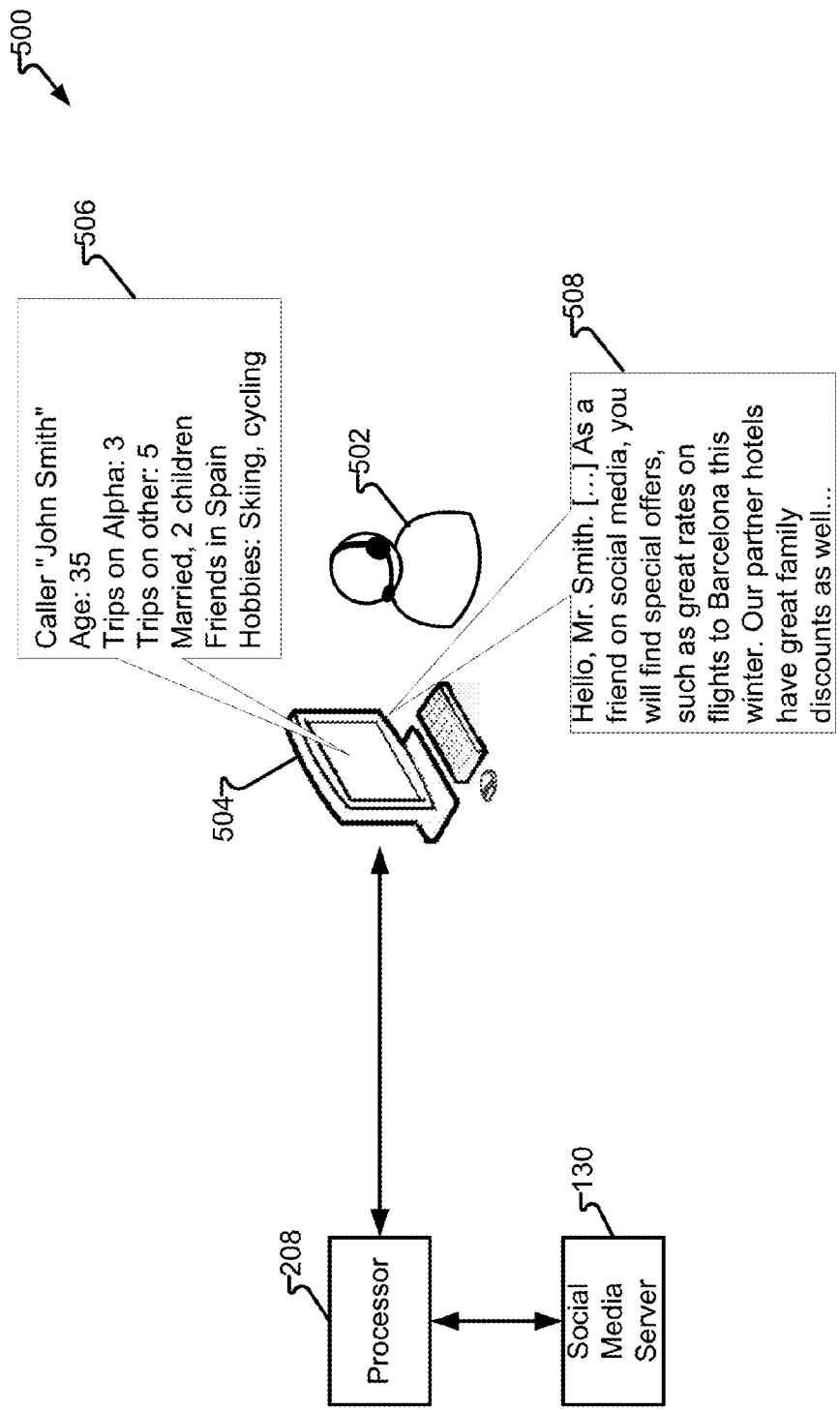
FIG. 5 depicts a contact center portion in accordance with embodiments of the present disclosure.

FIG. 5 depicts contact center portion 500 in accordance with embodiments of the present disclosure. In one embodiment, a user, such as customer 202, has agreed to an affinity with the contact center, such as contact center 102. In one embodiment, processor 208 provides interaction prompt 506 to agent 502, such as to thank the customer, introduce them to benefits they will be receiving, and/or other aspects of agreeing to the affinity.

In another embodiment, agent 502 addresses the issue for which the user has contacted the contact center and processor 208, upon determining customer 202 and agent 502 have concluded their interaction, prompts customer 202 to establish the affinity. Should customer 202 comply, the interaction may be identified as having a positive sentiment. However, if customer 202 does not comply, a reminder may be provided to customer 202. For example, a message may be sent utilizing the social media website or a message via other contact channel may be provided. Should customer 202 continue to not agree to the affinity, the interaction may be identified as having a negative sentiment.

The contact center 102 may then attempt to follow up with customer 202 to determine the reason for the positive/negative sentiment, route a subsequent call from customer 202 to the same agent 502, or to a different agent, based upon the determined sentiment, or take other action in accordance with customer sentiment and/or policies of contact center 102.

Figure 6:
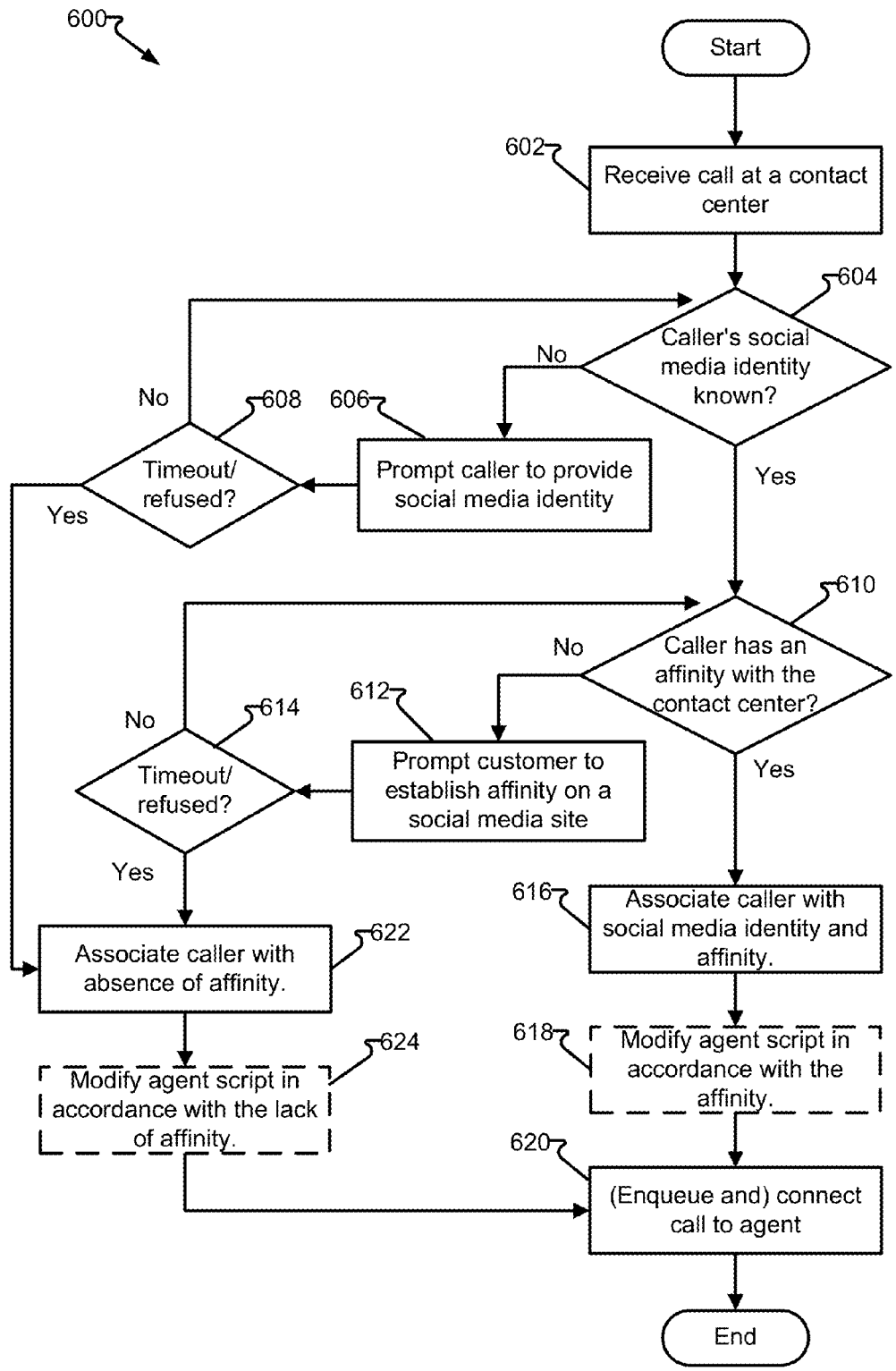
FIG. 6 depicts a first process in accordance with embodiments of the present disclosure.

FIG. 6 depicts a process 600 in accordance with embodiments of the present disclosure. In one embodiment, process 600 begins at step 602 receiving a call at a contact center 102. It should be appreciated that calls (e.g., audio-only communications) are one means of communication. In other embodiments, other means of communication, such as text chat, email, video chat, etc., are utilized by the caller. Step 604 determines if the caller's social media identity is known. In one embodiment, step 604 is performed by an agent and/or IVR prompting the caller to provide their social media identity. In another embodiment, such as when the caller is utilizing a different communications medium (e.g., text chat, email, etc.), step 604 may be determined by indexing an identifier provided in step 602 (e.g., caller ID, email address, user name, etc.) to a database, such as customer database 118 and/or social media server 130, to determine if the caller's social media identity is known.

If step 604 is determined in the negative, step 606 may be performed to prompt the caller to provide their social media identity. Step 606 may be performed by providing an audible prompt, such as by IVR 206, and/or human or automated resource 112 providing text-based prompting. Step 608 determines if a first time out or first refusal has occurred in response to the prompting for the social media identity. If step 608 is determined in the negative, processing may continue back to step 604 to reevaluate whether the caller's social media identity is now known. If step 608 is determined in the negative, processing may continue to step 622 where the caller is associated with the absence of affinity.

If step 604 is determined in the affirmative, processing may continue to step 610 wherein the caller's affinity with the contact center is determined. If step 610 is determined in the negative, processing may continue to step 612 where the customer is prompted to establish an affinity, such as by accepting an affinity request from or by initiating an affinity request to the contact center. Next, a second time out or refusal determination is made in step 614. If determined in the negative, processing may continue back to step 610 wherein the caller's affinity with the contact center is reevaluated. However if step 614 is determined in the positive, processing may continue to step 622 wherein the caller is associated with an absence of affinity. First and second time out step 608, 614 may be determined based upon a timeout condition within a first and second timeframe, respectively. One or both of the first and second timeframe determination step 608, 614 may be determined based upon a previously established threshold. The threshold may be based upon a time the caller spent on hold or likely to be waiting to establish connection with an agent. In another embodiment, the timeframe may be longer (e.g., hours, days, weeks, etc.), such as when the prompting for the social media identity and/or affinity is determined after the caller-agent interaction has completed (See FIG. 7).

If step 610 is determined in the affirmative, processing may then continue to step 616 where the caller is associated with a social media identity and is identified as having affinity with the contact center 102. Step 618 optionally modifies an agent script in accordance with the affinity, such as to provide special offers, special handling of the call, and/or other benefits associated with the affinity. Step 622 associates the caller with an absence of affinity and, optionally, step 624 modifies the agent script in accordance with the lack of affinity, for example, providing an increased incentive to establishing the affinity, assuming a negative sentiment, and/or other action associated with the caller's lack of affinity with the contact center 102. Step 620 is then enqueued, if no agent is yet available, and connects the call to an agent for processing the call and providing the service for which the caller has initiated the call to the contact center 102. The call is then processed by the agent to provide the service.

Figure 7:
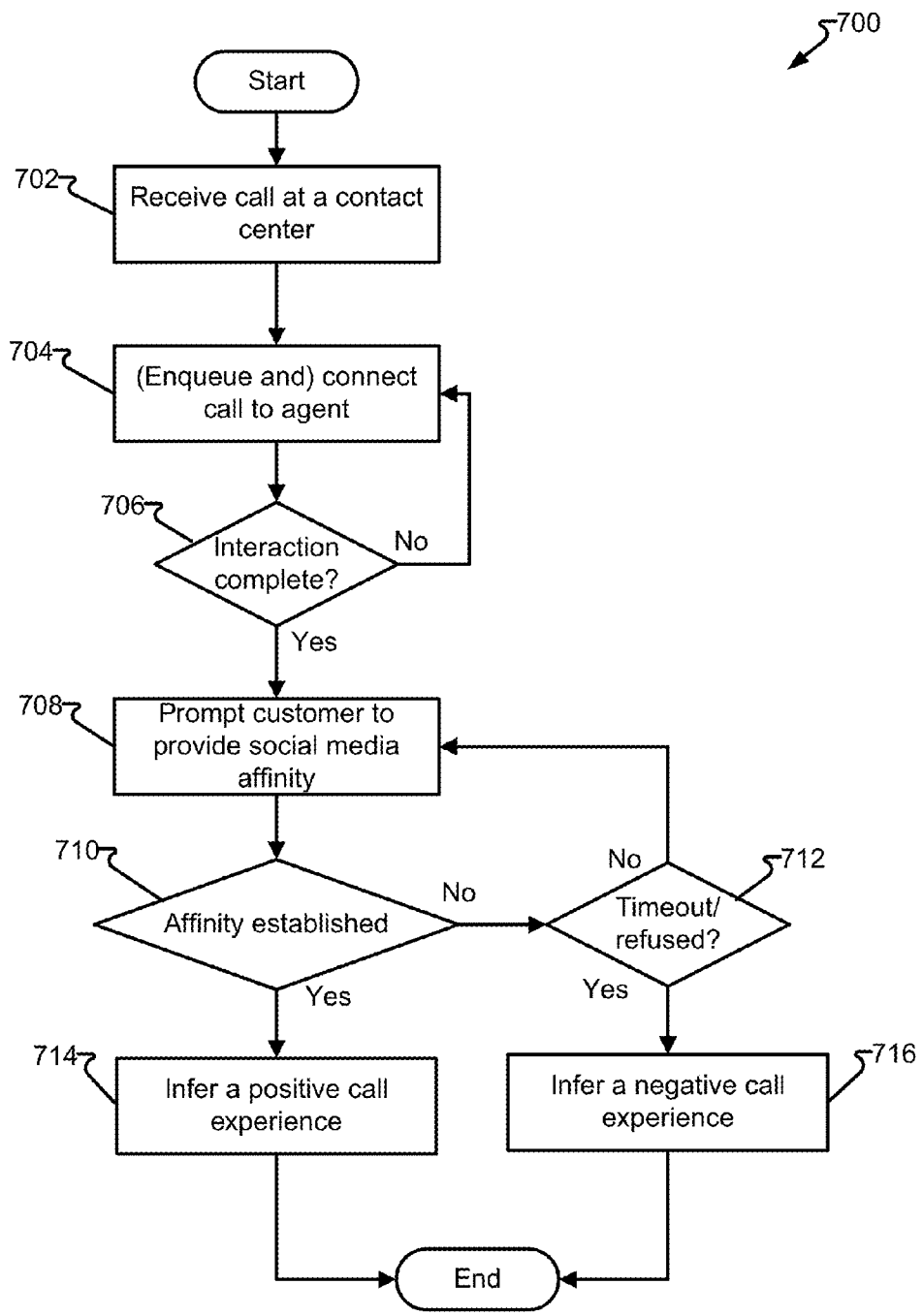
FIG. 7 depicts a second process in accordance with embodiments of the present disclosure.

FIG. 7 depicts a process 700 in accordance with embodiments of the present disclosure. In one embodiment, process 700 generally provides for the prompting of the caller for the affinity after the caller has interacted with an agent or otherwise concluded the transaction for which the caller has initiated the call. It should be appreciated that calls (e.g., audio-only communications) are one means of communication. In other embodiments, other means of communication, such as text chat, email, video chat, etc., are utilized by the caller. Step 702 is performed when a call is received from the caller at a contact center, such as caller 202 calling contact center 102. Step 704 connects the call to the agent immediately or upon enqueuing the call and waiting for an appropriate agent to become available. Step 706 determines if the interaction is complete and, if no, reverts back to step 704; otherwise, processing may continue to step 708. Step 708 may be performed if the caller is still connected to the contact center 102 or at a point afterwards such as by follow-up call or by contacting the caller via a secondary means of communication known to the contact center 102, such as via the caller's email address.

Next, step 710 determines if affinity has been established. If step 710 is determined in the negative, processing continues to step 712 wherein a timeout/refusal determination is made. For example, step 710 may be determined in the negative upon the caller expressly declining to establish an affinity by not acting on a request to establish the affinity, such as provided in step 708. A loop may be created with step 708, 710, 712 wherein the caller is prompted on one or more occasions to establish the affinity. A delay may be inserted, such as a few seconds to a few minutes, when the caller is still connected to the contact center 102. In another embodiment, the delay may be inserted from hours to days or even longer, if the caller is accessible via secondary means of communication, such as a call-back, email follow-up, text, etc. However, step 712 may determine that the caller, despite one or more promptings by step 708, is not going to establish the affinity. Therefore step 712, when determined in the affirmative, may proceed to step 716 wherein a negative call experience is inferred for the call. Conversely, if step 710 is determined in the affirmative step, then step 714 may infer a positive call experience.

Actions taken based upon the determination of a positive call experience, such as in step 714, or a negative call experience, such as step 716, may then be taken. For example, an interaction between a caller and an agent may be resolved positively or negatively, as suggested by caller 202 accepting or not accepting the affinity, and accordingly, the particular agent who handled the prior call may be designated as either desired or not desired, or ineligible, to process a future work item associated with caller 202. Follow-up calls or other inquiries may also be made to determine if the caller is unsatisfied with respect to a particular issue and if resolution may be made to improve the customer experience. If the affinity is established, promotions, rewards, incentives, or other benefits provided to the caller having the affinity with the contact center may be provided.

As a benefit of establishing the affinity, the caller receives certain perks. The contact center receives access to a caller's social media identity, which may lead to a better understanding of their customers and the goods and services they like or do not like, based upon social media elements, which may or may not be directly related to the contact center or goods and services provided by the contact center. The contact center may then strengthen the caller-contact center relationship to build loyalty, get advanced notice of issues, and/or otherwise improve the relationship with the caller.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

While illustrative embodiments of the disclosure have been described in detail herein, it is to be understood that the inventive concepts may be otherwise variously embodied and employed and that the appended claims are intended to be construed to include such variations, except as limited by the prior art.

What is claimed is:

1. A system, comprising:
   a communication interface to a network;
   a processor to:
      access a call from a caller from the network;
      prompt the caller to provide a social media identity of the caller on a social media website;
      upon receiving the social media identity of the caller, determine whether an affinity exists between the social media identity and an entity associated with the contact center, whereby the affinity exists upon determining that a profile, on the social media website, of the social media identity comprises a relationship with the entity associated with the contact center;
      upon determining that the affinity exists, selecting a first interaction with the caller in accordance with the affinity;
      upon determining that no current affinity exists between the social media identity and the entity associated with the contact center, selecting a second interaction with the caller in accordance with the absence of the affinity, wherein the second interaction differs from the first interaction; and
   conducting the selected one of the first interaction or the second interaction with the caller.

2. The system of claim 1, wherein, the processor, upon determining that no current affinity exists between the social media identity and an entity associated with the contact center, prompts the caller to establish an affinity.

3. The system of claim 2, wherein the processor prompts the caller to establish the affinity by sending an affinity request to the social media identity.

4. The system of claim 3, wherein the processor prompts the caller to establish the affinity by accepting the affinity request.

5. The system of claim 2, wherein the processor, upon determining that the affinity has been established, identifies the call as having a positive sentiment.

6. The system of claim 2, wherein the prompt to create the affinity comprises a prompt to the caller to create the affinity via an authenticated device, wherein the social media identity is authorized via the authenticated device to utilize account-holder functions of the social media website.

7. The system of claim 2, wherein the processor selects the social media website from a plurality of social media websites.

8. The system of claim 1, wherein the processor:
   upon first determining that the affinity does not exist, prompts the caller to establish the affinity;
   monitors the social media website for the affinity; and
   upon a second determining that the affinity does not exist within a first timeframe, re-prompts the caller to establish the affinity.

9. The system of claim 8, wherein the processor, upon a third determining that the affinity does not exist within a second timeframe, processes the caller as failing to establish the affinity.

10. The system of claim 9, wherein the call associated with the caller is associated with a negative sentiment.

11. A method, comprising:
   accessing a call from a caller on a network;
   prompting the caller to provide a social media identity of the caller on a social media website;
   upon receiving the social media identity of the caller, determining whether an affinity exists between the social media identity and an entity associated with the contact center, whereby the affinity exists upon determining that a profile, on the social media website, of the social media identity comprises a relationship with the entity associated with the contact center;

upon determining that the affinity exists, selecting a first interaction with the caller in accordance with the affinity;

upon determining that no current affinity exists between the social media identity and the entity associated with the contact center, selecting a second interaction with the caller in accordance with the absence of the affinity, wherein the second interaction differs from the first interaction; and conducting the selected one of the first interaction or the second interaction with the caller.

12. The method of claim 11, further comprising, upon failing to determine the affinity exists between the social media identity and an entity associated with the contact center, prompting the caller to establish the affinity.

13. The method of claim 12, wherein the step of prompting the caller to establish the affinity, further comprises, sending an affinity request to the social media identity.

14. The method of claim 13, further comprising prompting the caller to establish the affinity by accepting the affinity request.

15. The method of claim 12, wherein the step of prompting the caller to establish the affinity occurs prior to the caller speaking with the agent selected to address a reason for the call.

16. The method of claim 12, wherein the step of prompting the caller to establish the affinity occurs after the caller has spoken with the agent selected to address a reason for the call.

17. A system, comprising:
a communication interface to a network;
a processor to:
access a call from a caller from the network;
prompt the caller to authenticate a social media identity of the caller on a social media website;
upon receiving the authentication of the social media identity of the caller, determine whether an affinity exists between the social media identity and an entity associated with the contact center, whereby the affinity exists upon determining that a profile, on the social media website, of the social media identity comprises a relationship with the entity associated with the contact center;
upon determining that the affinity exists, selecting a first interaction with the caller in accordance with the affinity;
upon determining that no current affinity exists between the social media identity and the entity associated with the contact center, selecting a second interaction with the caller in accordance with the absence of the affinity, wherein the second interaction differs from the first interaction; and conducting the selected one of the first interaction or the second interaction with the caller.

18. The system of claim 17, wherein the processor prompts the caller to authenticate the social media identity prior to the caller speaking with an agent selected to address a reason for the call.

19. The system of claim 17, wherein the processor prompts the caller to authenticate the social media identity after the caller has spoken with an agent selected to address a reason for the call.

20. The system of claim 17, further comprising, upon not receiving the authentication of the social media identity of the caller within a previously determined timeframe, associating the call with a negative sentiment.

* * * * *